Jan. 20, 1931.   M. U. BÜCHTING ET AL   1,789,863
ARRANGEMENT FOR THE REGULATION OF STEAM GENERATORS
Filed Nov. 23, 1927
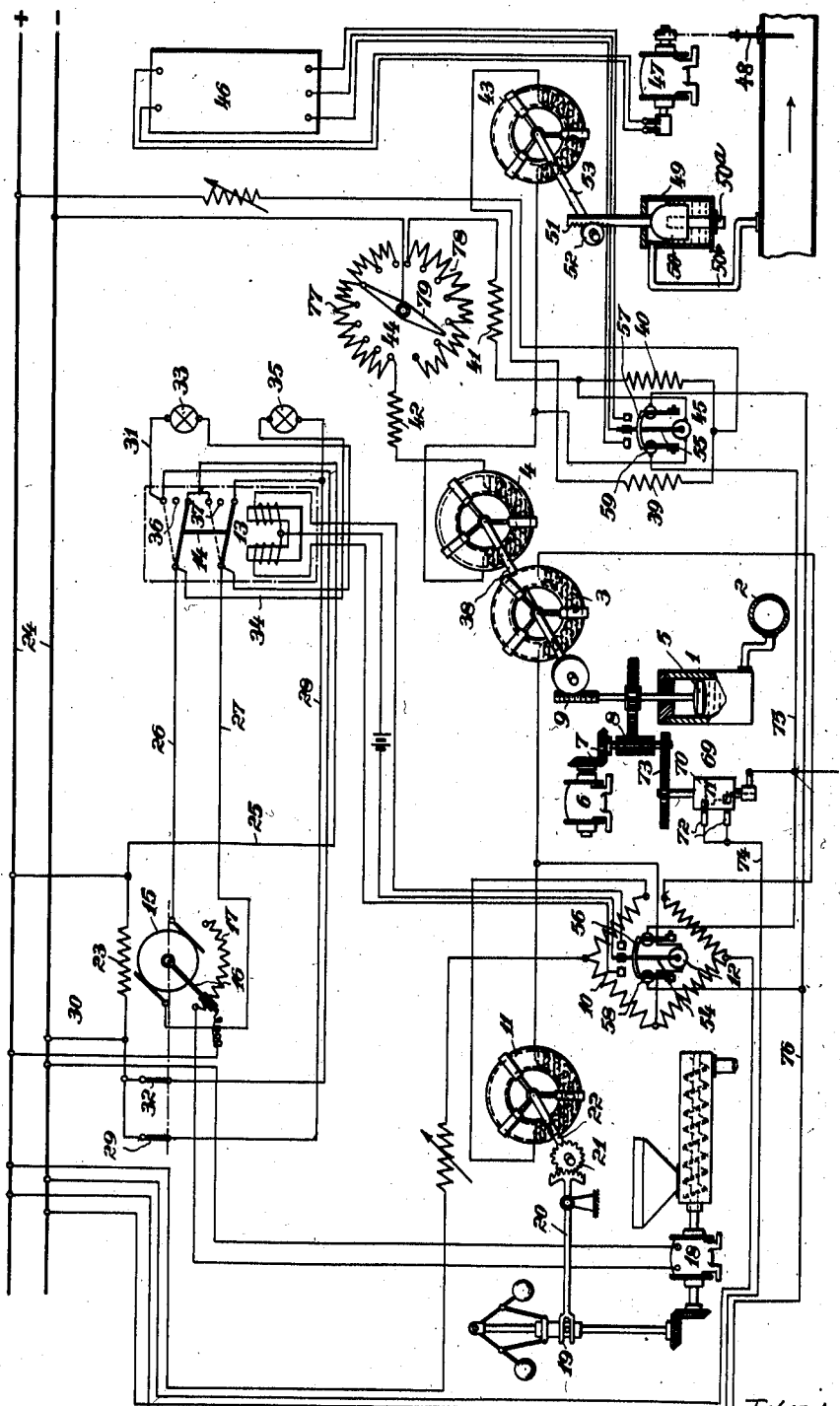
INVENTORS
MAX ULRICH BÜCHTING
HEINZ GRÜSS
WILHELM LIESEGANG
BY
ATTORNEYS.

Patented Jan. 20, 1931

1,789,863

UNITED STATES PATENT OFFICE

MAX ULRICH BÜCHTING, OF BERLIN, HEINZ GRÜSS, OF BERLIN-STAAKEN, AND WILHELM LIESEGANG, OF BERLIN-CHARLOTTENBURG, GERMANY, ASSIGNORS TO SIEMENS & HALSKE, AKTIENGESELLSCHAFT, OF SIEMENSSTADT, NEAR BERLIN, GERMANY, A CORPORATION OF GERMANY

ARRANGEMENT FOR THE REGULATION OF STEAM GENERATORS

Application filed November 23, 1927, Serial No. 235,338, and in Germany November 26, 1926.

The invention relates to a new and useful arrangement for the regulation of steam generators.

The principal object of the invention is to provide a single measuring device connected to the main steam header for adjusting means for regulating the fuel and the air supply of the individual steam generators. For this purpose electrical transmitter resistances may be regulated by the measuring device, for instance by a pressure gauge with a piston. In that way, on the one hand is ensured a simple construction of the transmitter device, and on the other hand the reliability of working of the arrangement is increased. Each of the transmitter resistances regulated by one and the same measuring device, is preferably connected in a bridge connection, by which is controlled a regulating organ of a steam generator.

In such an installation, it is often desirable in practice to let the individual generators work with different loads. In order to solve this problem in a simple and reliable manner, in the connections to which belong the individual transmitter resistances are preferably arranged the parts of a double resistance in such a manner that they can be adjusted simultaneously in the same sense and to such an extent as to definitely determine the load on the corresponding steam generators.

In the accompanying drawing is shown diagrammatically by the way of example an embodiment of the invention.

A measuring instrument 1 connected to the main steam header 2 sets two transmitter resistances 3 and 4. The measuring instrument is shown as a pressure gauge with a piston 5 which is rotated at a constant speed by a motor 6 over the gears 7 and 8. Instruments of this type are well-known in themselves. The gearing 9 between the resistances 3 and 4 and the piston 5 is constructed in such a manner that only the axial movement of the piston 5 causes an adjustment of the resistances which consist of hollow rings of insulating material within which are arranged resistance wires and suitable quantities of mercury. Gravity holds each body of mercury in the lower portion of the respective hollow ring, and according to the position given to said ring by the gearing 9, the bare resistance wire or coil (which rotates in unison with such ring) will dip more or less into said body of mercury, the latter short-circuiting a greater or smaller number of the turns of the coil, and thereby varying or adjusting the resistance.

The resistance 3 belongs to a Wheatstone bridge 10, which comprises four constant resistances and another regulating resistance 11 of the same type as the resistance 3. The relay 12 in the diagonal branch of the bridge 10 controls the circuit for an electromagnet 13, which actuates a switch 14. This switch controls in a manner to be described later, the circuit of a second motor 15 for the running to the right or to the left, or switches off this motor. The motor 15 is adapted to move a contact arm 16 over a resistance 17 lying in series with the exciting coil—not represented—of a motor 18 for regulating the fuel supply. The speed of the motor 18 is indicated by a device 19 of a construction known as a centrifugal regulator or governor. The device 19 is coupled by means of a lever 20 and toothed gearing 21 to the shaft 22 on which the resistance 11 is mounted. By this arrangement an adjustment of the transmitter resistance 3 causes a variation of the speed of the motor 18 as long as the equilibrium of the Wheatstone bridge 10 is not restored by a corresponding adjustment of the resistance 11.

If the switch 14 controlled by the relay 13 is for instance in the position shown in full lines, the motor 15 will rotate for instance to the right and will move accordingly the contact organ 16 and thereby vary the speed of the motor 18. The excitation coil 23 of the motor 15 is always connected to the mains 24. The circuit for the right hand rotation of the motor 15 goes from the positive mains conductor 24 through the wire 25, the upper arm of the switch 14, the wire 26, armature of motor 15, wire 27, through the lower switch arm of the switch 14, wire 28, contact 29, wire 30 to the negative mains conductor. At the same time there will be moreover closed through the wire 31 and contact 32, the circuit for the signal lamp 33 which, by lighting up, will indicate the direction of rotation of the motor 15. The motor 15 then regulates the speed of the motor 18 for instance to increased fuel admission. This alters the setting of the speed measuring device 19 which, in its turn, will move the annular tubular resistance 11 until the disturbed equilibrium of the bridge 10 is re-established.

If the transmitter resistance 3 is moved by the measuring instrument 1 in a direction opposite to that assumed in the foregoing, the electromagnet 13 will be energized by the contact closed by the measuring device or relay 12 in such a manner that it will bring the switch 14 into the position shown dotted. The motor 15 is then connected for rotating to the left. In such a case the circuit goes from the positive mains conductor 24 through the wire 25, the lower switch lever of the switch 14, wire 27, armature winding of the motor, wire 26, wire 34, signal lamp 35, contact 29, wire 30 to the negative pole of the mains. The signal lamp 35 will then light up and indicate thereby that the motor 15 rotates in the direction opposite to that of the previous working. The motor 15 then regulates the speed of the motor 18 and thereby the fuel admission in such a manner that the speed measuring device 19 again sets the regulating resistance 11 in such a manner the disturbed bridge equilibrium is re-established. When finally the electromagnet 13 loses its excitation, the switch 14 will again occupy the "off" position indicated by the contacts 36 and 37.

In order to be able easily to see at any moment the sense or direction of regulation of the motor 15, the two signal lamps 33 and 35 are preferably made of different colors, for instance, red and green. The contacts 29 and 32 are operated in response to the movement of the motor 15 so that they make inoperative the circuits of the switch 14 if the motor 15 reaches predetermined end positions.

The annular resistance 4 which is mounted on the shaft 38 adjusted by the piston 5 belongs to another Wheatstone bridge containing the resistances 39, 40, 41, 42, the variable resistance 43 and the double resistance 44. This bridge connection is adapted to regulate the air supply as follows. Upon a change of the adjustment of the resistance 4 the equilibrium of the bridge connection is disturbed and the relay 45 of the bridge deflects to the left or the right. By the closing of the left or the right contact of the relay 45 a switching device 46 is actuated which controls the circuit of the motor 47. The device 46 may have the same construction as the elements 13 and 14 above described. Therefore it is only shown as a rectangle. The motor 47 starts and moves the damper 48 as long as the equilibrium of the bridge is disturbed. This is controlled by a draft measuring instrument 49 which adjusts the resistance 43 so as to compensate the adjustment of the resistance 4 with respect to the bridge. The instrument 49 comprises a bell shaped float 50 mounted within a closed cylinder. The mouth of the bell shaped float dips into a quantity of fluid contained in said cylinder and a pipe $50^a$ which leads to the atmosphere has its upper end extending within said float on the lower side thereof. The space within the cylinder above said float is connected by the pipe $50^b$ to the air supply line whereby increase in the volume and velocity of the air passing through said line will tend to create a vacuum above the float and thus bring an upward movement thereof while a decrease of the air supply will permit the float to descend. The movement of the float is transmitted over a toothed rack 51 and a gear wheel 52 to the shaft 53 carrying the annular resistance 43.

In order to get a good regulation and to avoid an overtravel, provision is made to close and to interrupt the contacts of the relays 12 and 45 at predetermined intervals. For this purpose the contacting members 54 and 55 of the relays 12 and 45 are intermittently pressed downwards and freed by the depressors 56 and 57. The movements of the depressors 56 and 57 are caused by electromagnets 58 and 59 the circuits of which are controlled by a contacting device 69. This device comprises a rotatable drum 70 with two contact pieces 71 and two stationary sliding brushes 72. The drum is rotated by the motor 6 over the gearing 7, 73. The brushes 72 are connected to the negative main line 24 by the wire 74, while the contact pieces 71 are connected in series to the wire 75 leading to one end of the coils of the electromagnets 56, 57, the other end being connected to the positive main line 24 by the wire 76. By the arrangement above described the depressors 58, 59 intermittently press down and free the contacting members 54, 55 of the relays 12, 45 and, if these members stand over one of their counter-contacts, will make and break the contacts at regular intervals.

We have for reasons of simplicity hitherto assumed that the new arrangement is to be used for the regulation of the fuel and air supply of a single steam generator. If a plurality of steam generators are connected to the main header 2 an equal number of exactly analogous arrangements as shown in the drawing are provided, one for each of the steam generators. The transmitter resistances of all the regulating arrangements are adjusted by the piston 5. This may be effected, for instance, by mounting all these transmitter resistances on the shaft 38 of the transmitter resistances 3 and 4 which belong to the first steam generator. It will be understood that in this case all the steam generators work with the same load. In practice, however, it is often desired to have different loads on the individual boilers. In order to enable this, in the regulating arrangement of each boiler a double resistance like that shown at 44 is provided. This resistance consists of two parts 77 and 78 which are controlled by a common regulating organ 79. We prefer to use a stepped resistance with unequal steps as shown in the drawing. If it is desired for instance to let the boiler to which the resistance 44 belongs work with only 80% load, the regulating organ 79 is moved by hand so that it switches out a predetermined part of the resistance. Owing to this adjustment of the organ 79 the equilibrium of the bridge to which the resistance is connected is disturbed. The motor 47 is then actuated by means of the above described control arrangement in such a manner that it adjusts the damper 48 in accordance with the position of the member 79. It is essential that after the re-establishment of the bridge equilibrium the corresponding bridge be controlled after each movement of the transmitter resistance 4 in an exactly similar manner to the other boilers which are regulated in response to changes in the position of the piston 5. If the total resistance of the parts 77, 78 is switched off by means of the contact organ 79, the corresponding boilers work with 100% load.

What we claim as our invention and desire to be secured by Letters Patent is:

1. In an arrangement for the automatic regulation of steam generators the combination of a first adjustable resistance, a pressure gauge with a rotating piston connected to the steam pipe and adapted to adjust said first resistance in correspondence with the axial displacement of said piston, a second adjustable resistance and a relay, electrical connections between said first, said second resistance and said relay to form a Wheatstone bridge, a motor for the fuel supply, means for varying the speed of said motor in response to the working of said relay, and a speed indicator for said motor, adapted to adjust said second resistance so as to restore the equilibrium of the Wheatstone bridge.

2. In an arrangement for the automatic regulation of steam generators the combination of a first adjustable resistance, a pressure gauge with a rotating piston connected to the main header and adapted to adjust said first resistance in correspondence with the axial displacement of said piston, a second adjustable resistance, a third double regulating resistance, a relay, electrical connections between said first, said second, said third resistance and said relay as to form a Wheatstone bridge, a motor for varying the air supply in response to the working of said relay and a device for measuring the draft before the damper and adapted to adjust said second resistance so as to restore the equilibrium of said Wheatstone bridge.

3. In an arrangement for the automatic regulation of steam generators the combination of a first motor for the fuel supply, means for varying the speed of said motor, a second motor for operating said means, a relay for switching said second motor to left or right rotation, signal lamps adapted to indicate the direction of rotation of said second motor, a first regulating resistance for actuating said relay, a pressure gauge with a piston for measuring the steam pressure and adapted to adjust said resistance, a speed indicator for said first motor, a second regulating resistance adapted to compensate the effect of said first resistance with respect to said relay and mechanical means for coupling said speed indicator to said second resistance so as to adjust the latter.

4. In an arrangement for the automatic regulation of a plurality of steam generators, which supply a main steam pipe, the combination of a plurality of first Wheatstone bridges, one for each generator, for regulating the individual fuel supply, a plurality of second Wheatstone bridges, one for each generator, for regulating the individual air supply, and a single pressure gauge with a piston connected to the main steam pipe and adapted to simultaneously adjust said first Wheatstone bridges and said second Wheatstone bridges, individual devices for measuring the fuel supply and for compensating the adjustment of said pressure gauge with respect to said first Wheatstone bridges and other individual devices for measuring the draft before the damper and adapted to compensate the adjustment of said pressure gauge with respect to said second Wheatstone bridges.

5. In an arrangement for the automatic regulation of steam generators, which supply a main steam pipe, the combination of a plurality of first Wheatstone bridges, one for each generator, for regulating the individual fuel supply thereof, a plurality of second Wheatstone bridges, one for each generator for regulating the individual air supply thereof, a plurality of double regulating resistances each of them electrically connected with one of said first or said second Wheatstone bridges for regulating by hand the individual loadings of the generators, and a single pressure gauge with a piston connected to the main steam pipe and adapted to simultaneously adjust said first Wheatstone bridges and said second Wheatstone bridges, individual devices for measuring the fuel supply and for compensating the adjustment of said pressure gauge with respect to said first Wheatstone bridges and other individual devices for measuring the draft before the damper and adapted to compensate for the adjustment of said second Wheatstone bridges by said pressure gauge.

6. In an arrangement for the automatic regulation of steam generators, which supply a main steam pipe, the combination of a plurality of first Wheatstone bridges, one for each generator, for regulating the individual fuel supply, a plurality of second Wheatstone bridges, one for each generator for regulating the individual air supply, a single pressure gauge with a rotating piston connected to the steam pipe, a plurality of adjustable resistances mechanically connected to and adjustable by said piston, one of said resistances being arranged in one of said first Wheatstone bridges, a rotatable drum with contact pieces, one for each Wheatstone bridge, sliding brushes on said pieces and a motor for rotating both said piston and said drum.

7. In an arrangement for the automatic regulation of steam generators, the combination of a first adjustable resistance, a pressure gauge connected to the steam pipe and adapted to adjust said first resistance, a second adjustable resistance and a relay, electrical connections between said first, said second resistance and said relay as to form a Wheatstone bridge, a time switching device coordinated to said relay and adapted to close and to interrupt the contact of said relay periodically, a motor for adjusting a regulating member of the generator, electrical connections between said relay and said motor for controlling the speed of the latter, a speed responsive device operated by said motor and means connected with said device to reestablish the equilibrium of said Wheatstone bridge.

8. In an arrangement for the automatic regulation of steam generators, the combination of a first adjustable resistance, a pressure gauge with a rotating piston connected to the steam pipe and adapted to adjust said first resistance, a second adjustable resistance and a relay, electrical connections between said first, said second resistance and said relay as to form a Wheatstone bridge, a rotating drum with a contact piece, a brush sliding on said piece, an electromagnet and a depressor, circuit connections between said brush and said electromagnet, the latter attracting said depressor at the moment said brush touches said contact piece, so as to control said relay in the diagonal branch of said Wheatstone bridge.

In testimony whereof we affix our signatures.

MAX ULRICH BÜCHTING.
HEINZ GRÜSS.
WILHELM LIESEGANG.